Feb. 8, 1966  N. W. F. PHILLIPS ETAL  3,234,013
DECOMPOSING METHOD AND APPARATUS FOR SUBHALIDE DISTILLATION
Filed Aug. 6, 1963
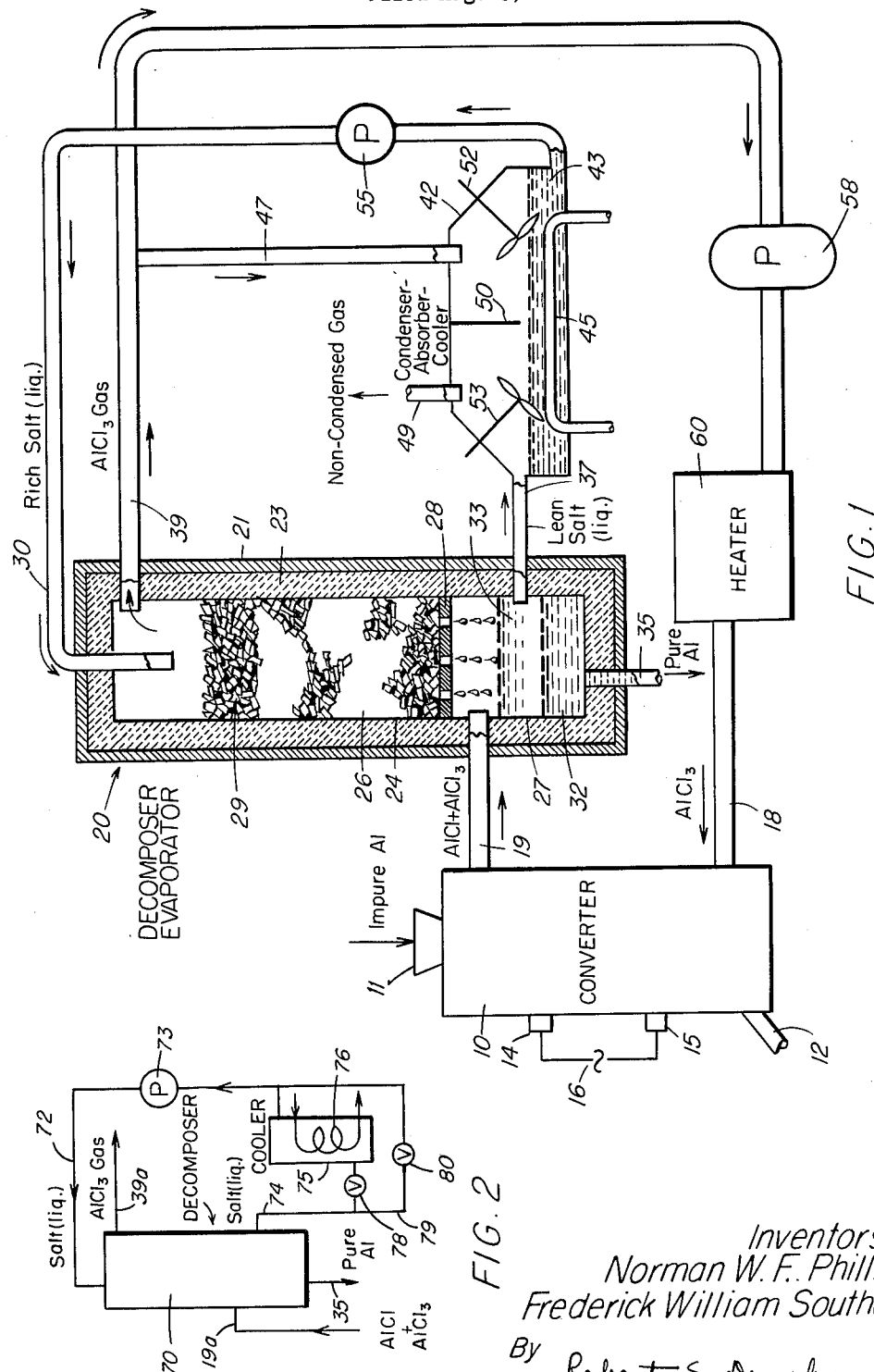
Inventors
Norman W. F. Phillips
Frederick William Southam
By Robert S. Dunham
Attorney

3,234,013
DECOMPOSING METHOD AND APPARATUS FOR SUBHALIDE DISTILLATION
Norman W. F. Phillips and Frederick William Southam, Arvida, Quebec, Canada, assignors to Aluminium Laboratories Limited, Montreal, Quebec, Canada, a corporation of Canada
Filed Aug. 6, 1963, Ser. No. 300,364
18 Claims. (Cl. 75—68)

This application is a continuation-in-part of our copending application Serial No. 236,353, filed November 8, 1962, now abandoned for Decomposing Method and Apparatus for Subhalide Distillation.

This invention relates to the so-called subhalide distillation of aluminum, and is particularly directed to procedure and apparatus for decomposing gaseous aluminum subhalide to obtain a purified or refined aluminum product.

The recovery of purified aluminum metal from impure aluminum-containing metallic material by subhalide distillation involves treating the material to produce a subhalide of aluminum in gaseous state, and decomposing the subhalide gas in a reverse chemical reaction which yields relatively pure aluminum metal together with a normal aluminum halide in separated or separable form. In a preferred way of carrying out this process, the impure material is heated and exposed to a flow of aluminum trichloride gas (i.e. $AlCl_3$) in a suitable converter. At appropriate temperatures, ordinarily in the range of about 1000° C. and upwards, aluminum in the material reacts with the aluminum trichloride to form aluminum monochloride gas (i.e. $AlCl$). This monochloride gas, usually intermixed with unreacted trichloride, is conducted from the converter to condenser apparatus (herein for convenience termed a decomposer) where it is reduced in temperature and thereby caused to decompose or dissociate into aluminum metal, desirably in molten form for ease of removal from the decomposer, and aluminum trichloride gas, which may be withdrawn from the decomposer together with the aforementioned unreacted trichloride gas and recycled to the converter for re-use therein.

Since the monochloride dissociation reaction is exothermic in character, the cooling action provided in the decomposer must be effective not only to remove heat from the gas as introduced to the decomposer but also to absorb the heat of reaction produced as the monochloride decomposes, in order to maintain the requisite reduced temperature conditions for such dissociation. At the same time, it is important that the internal temperature of the decomposer, at least in collecting the metal, be kept above the melting point of aluminum (about 660° C.) so that the aluminum produced and accumulated in the decomposer will remain in molten state therein as desired. Thus satisfactory decomposer function requires the provision of efficient heat removal without excessive cooling, advantageously in a manner suitable for commercial or like large-scale operation.

An important object of the present invention is to provide improved procedure and apparatus for effecting such monochloride decomposition in a facile and efficacious manner suitable for practice on any desired scale of operation.

To this and other ends, the present invention in a broad sense contemplates effecting direct contact of the monochloride-containing gas, as discharged from the converter, with a molten salt which is below the temperature of the gas. Such contact may be effected in any of a variety of gas-liquid contacting devices such as spray towers, packed beds, wetted wall columns, tray columns, splash condenser or the like, e.g. providing for contact of gas and liquid in countercurrent flow and in particular providing an extended gas-liquid contact surface. Thus, by way of example, a generally upward flow of gas from the converter (i.e. a heated mixture of monochloride gas and unreacted trichloride gas) may be established in a decomposing region in intimate contact with a generally downward flow of molten salt therein. Heat exchange between the gas and salt occurs as a result of such contact; specifically, the salt cools the gas to a temperature at which the monochloride decomposes into aluminum metal and trichloride gas, and takes up the heat of reaction produced by the exothermic monochloride dissociation so as to maintain the monochloride at such temperature.

The molten salt as introduced to the decomposing region may initially be at a temperature above (usually only slightly above) or somewhat below the melting point of aluminum, but its temperature as discharged from said region should be above the melting point of aluminum. The aluminum produced in the decomposition of the aluminum monochloride is carried with the downward flow of molten salt to the lower portion of the decomposing region, where it collects in a molten pool. If the temperature of the salt is initially above the melting point of aluminum, the aluminum produced will be in the form of liquid droplets. If the temperature of the salt is initially below the melting point of aluminum, the aluminum produced will be in solid particulate form, which however, will melt on reaching the metal pool. The initial temperature of the molten salt as it enters the gas contact region may be selected to suit the conditions chosen for the operation and system, a major factor being the temperature desired for the aluminum trichloride gas discharging from such region, it being understood that with countercurrent gas and liquid flows such discharge occurs in the vicinity of the ingress of molten salt. Optimum initial salt temperature can be readily determined by simple test if necessary, for any type and size of decomposer and for selected operating conditions; for instance, if it appears that undue cooling is causing the aluminum to form as a fog or smoke (as may be likely to occur should the incoming salt temperature be as low, say as 200° C.) or is causing incrustation of solid metal on surfaces, e.g. of the packing, inside the decomposer, a substantially higher inlet salt temperature should be employed, to insure washing down of metal particles or droplets. In all cases, whatever the initial temperature of the salt, it should be such that the latter is sufficiently heated, by the gas contact and decomposing operation, to reach a temperature appreciably above the melting point of aluminum, as it approaches the locality where such salt collects.

As indicated, the molten salt (as well as the molten metal) collects at the lower portion of the decomposing region. However, the molten salt used is selected to have a specific gravity substantially different from that of molten aluminum, so that the aluminum and molten salt collect in discrete pools (i.e. one floating on the other) at the bottom of the decomposing region and may with facility be separately removed therefrom. Consequently, the molten salt may be removed for cooling at an external locality and recirculated to the decomposing region for re-use as the heat exchange medium, while quantities of molten aluminum are discharged, e.g. periodically, as the desired purified product of subhalide distillation. The trichloride gas produced in the dissociation reaction, together with the unreacted trichloride constituent of the introduced gas from the converter, is withdrawn from an upper locality in the decomposing region.

Very advantageously, the molten salt employed in the present invention may be provided by a chemically stable, low melting point molten salt mixture including as one constituent a substantial proportion of aluminum trichloride. When a molten salt mixture of this character is used, conditions may be selected, if desired, so that the heat exchange occurring in the decomposing region evaporates a portion of the aluminum trichloride contained in the mixture. In this situation, the initial excess heat of the gas from the converter and the heat produced by monochloride dissociation are taken up not only in raising the temperature of the molten salt but also in part as heat of evaporation of aluminum trichloride, with some advantage in heat removal action. The trichloride gas evaporated from the salt mixture is removed from the decomposing region in admixture with the trichloride gas otherwise produced in or introduced to the latter region as explained above.

In such case, the molten salt mixture collecting at the bottom of the decomposing region will be somewhat lean in aluminum trichloride, owing to the evaporation resulting from heat exchange contact with the gas as the salt passes through the decomposing region. For economy of operation, this trichloride-lean molten salt is withdrawn from the decomposing region, cooled, supplied with additional aluminum trichloride, and as thus enriched in trichloride is recycled to the decomposer to serve again as the heat exchange medium therin. As a particular feature of convenience and economy, the enrichment of the lean salt mixture with trichloride may be accomplished by exposing the cooled lean salt mixture to a portion of the trichloride gas withdrawn from the decomposing region, e.g. in a suitable splash condenser to which such portion of the trichloride gas is diverted, under conditions such that the trichloride gas is condensed or absorbed in the salt mixture to augment the trichloride content of the mixture. The remainder of the trichloride gas from the decomposing region may be recycled to the converter for re-use therein.

Such condensation of a portion of the trichloride gas in the salt mixture has the further advantage of removing impurities from the recirculating stream of trichloride gas. The gas discharged from the converter contains gaseous contaminants or impurities such as hydrogen or methane, produced in the converter, which pass through the decomposing region and tend to build up in the stream of trichloride gas circulating between the decomposer and the converter, undesirably diluting the trichloride gas, as this gas is repeatedly recycled through the subhalide distillation system. However, a portion of these impurities accompanies the portion of trichloride gas diverted for condensation in the salt mixture according to the procedure described above. When the trichloride condenses in the salt mixture, the contaminants remain in gaseous form and may readily be removed from the system; the trichloride re-evaporated from the salt mixture in the decomposing region is consequently purified. In such manner, therefore, the buildup of impurities in the circulating trichloride flow can be effectively controlled.

Further features and advantages of the invention will be apparent from the detailed description hereinbelow set forth, together with the accompanying drawing, in which:

FIG. 1 illustrates schematically a subhalide distillation system incorporating the apparatus of the present invention in one particular embodiment; and FIG. 2 is a diagram of a part of a system that is otherwise similar to FIG. 1, showing a modified embodiment wherein there is no evaporation from the salt in the decomposer.

Referring to FIG. 1, the subhalide distillation system there shown includes a converter 10 of conventional character, e.g. having an elongate, upright refractory-lined internal heating chamber (not shown) adapted to contain a mass of impure aluminum-bearing metallic material in lump or granular form. This material is introduced to the chamber through an inlet shown as a hopper 11 opening at the top of the converter, and is withdrawn from the chamber (after treatment therein to effect removal of aluminum) through an outlet at the lower end of the converter, represented as a conduit 12. The converter also includes means for passing an electric current through the mass of material in the chamber to effect electrical resistance heating of the material; such means are illustrated as a pair of vertically spaced electrodes 14, 15, which may be of annular or other configuration arranged for contact with the material in the chamber, and which are connected to a suitable power source 16. A gas inlet conduit 18 opening at a lower region of the converter chamber and a gas outlet conduit 19 arranged for withdrawal of gas from an upper locality in the chamber are also provided. It will be appreciated that the foregoing structures are herein shown and described in highly simplified form and by way of illustration only, to exemplify one type of converter with which the present invention may be associated.

In the operation of such a converter, the internal converter chamber is substantially filled with the lumps and granules of impure material to be treated, an example of such material being the crude alloy produced by the direct reduction of bauxite. This material in the chamber is maintained, as by the aforementioned electrical resistance heating, at a temperature e.g. in the range of about 1000° C. and upwards. Heated aluminum trichloride gas, introduced to the chamber in a continuous flow through the conduit 18, passes upwardly through the chamber, permeating the interstices of the heated mass of crude alloy or other material therein. Under the conditions of elevated temperature maintained in the chamber this trichloride gas reacts with aluminum in the alloy to form aluminum monochloride gas. Desirably the converter operation is carried forward in an essentially continuous manner; thus, successive increments of unreacted alloy are introduced through the hopper 11 to the top of the mass in the converter chamber, and advanced downwardly through the chamber, being progressively depleted of aluminum by contact with the continuing flow of trichloride gas. The alloy arriving at the lower end of the chamber is substantially exhausted of aluminum and is discharged therefrom through the outlet conduit 12 as a waste residue, to accommodate fresh increments of unreacted alloy at the upper end of the chamber.

The monochloride gas produced in the converter, together with unreacted trichloride gas, is withdrawn (e.g. continuously) from the converter chamber through the gas outlet conduit 19. As thus discharged, the monochloride-trichloride gas mixture is at a temperature approximating the converter chamber temperature, i.e. in the range of about 1000° C. and upwards. This gas is delivered by the conduit 19 to a decomposer, generally designated 20.

In accordance with the present invention, the decomposer 20 comprises a steel vessel 21 having a refractory lining 23 composed of material resistant to deterioration by the gases and liquids to which it is exposed at the temperatures involved. The lining 23 defines an elongate, upright internal decomposing chamber 24 separated into an upper tower portion 26 and a lower sump portion 27 by a perforate plate 28 (composed, for example, of graphite) extending horizontally across the chamber 24, conveniently at a sub-median locality in the chamber such that the tower 26 is of greater vertical extent than the sump 27. The tower 26 is filled (e.g. to the level shown) with a packing 29 of refractory material, such as alumina lumps, which is inert with respect to the gasses and other substances to which it is exposed; this packing, as shown, is supported on the perforate plate 28.

A conduit 30, adapted to convey a molten salt to the decomposing chamber, opens downwardly through the top of the tower 26 in such manner as to deliver the molten salt to the upper surface of the packing 29. Desirably this molten salt is sprayed more or less evenly over the surface of the packing so that it passes downwardly through the packing in a thoroughly dispersed fashion flowing over the individual lumps or elements of the packing. The conduit 19 conveying the heated monochloride-trichloride gas mixture from the converter opens in the upper part of the sump 27, i.e. just below the perforate plate 28, such that the gas delivered by the conduit 19 will pass upwardly through the perforate plate and thence through the packing countercurrent to the aforementioned flow of molten salt. The perforate plate serves to distribute the flow of gas evenly through the packing.

In this way effective gas-liquid contact between the upward flow of gas from the converter and the downward flow of molten salt from the conduit 30 is effected in the tower portion of the decomposer and specifically in the packing 29. That is to say, the tower 26 and packing 29 function as a conventional packed tower in providing thorough gas-liquid contact. The downward flow of liquid is spread over the individual packing elements providing an extended contact surface area so that the dispersed upward flow of gas through the packing is thoroughly exposed to the salt.

The decomposer 20 in the form shown is adapted for use with a molten salt mixture containing a substantial proportion of aluminum trichloride as one constituent thereof and having a specific gravity lower than that of molten aluminum. In the operation of the decomposer, this molten salt mixture is delivered to the top of the tower portion 26 through the conduit 30 at a suitable temperature which may be selected as indicated hereinabove and which is preferably quite substantially below the temperature of the gas introduced through the conduit 19. The gas-liquid contact effected in the packing 29 between the countercurrent flows of gas and molten salt mixture is effective to cool the introduced gas from the converter by transfer of heat therefrom to the molten salt. This heat is taken up by the molten salt both in raising the temperature of the salt and also, in the specific process assumed for FIG. 1, in evaporating aluminum trichloride gas from the salt. As a result of such cooling, the monochloride in the gas is caused to dissociate into aluminum metal and aluminum trichloride gas; dependent on the temperature of the salt, the metal is in molten form, or is in particulate solid form, becoming molten as it is carried toward, or when it reaches, the pool at the bottom.

Thus the produced aluminum metal is carried with the molten salt down through the packing 29, and thence through the perforate plate 28 into the sump, where the molten aluminum collects in a pool 32 at the lower end of the sump and the molten salt collects in a separate pool 33 which floats on the pool of molten aluminum because of its lower specific gravity. Means shown as a conduit 35 opening downwardly from the lower end of the sump are provided for effecting withdrawal of molten aluminum from the sump, and means shown as a conduit 37 opening through the side of the sump above the level of the molten aluminum pool 32 are provided for separately withdrawing molten salt from the sump. An outlet is also provided for the aluminum trichloride gas produced in or introduced to the decomposing chamber, such outlet being illustrated as a conduit 39 opening at the upper extremity of the tower 26.

The system shown further includes an absorber comprising a vessel 42 to which molten salt from the pool 33 in the decomposer sump is delivered by the conduit 37. The absorber vessel is adapted to contain a pool 43 of the molten salt thus delivered, and includes cooling means shown as a pipe 45 disclosed in the vessel to be immersed in the pool of molten salt 43 and adapted to convey a circulating flow of suitable coolant liquid such as water from an external supply (not shown). As will be understood, with such cooling means heat from the molten salt is transferred to the circulating flow of coolant and the temperature of the molten salt is thereby reduced.

Due to the evaporation of aluminum trichloride from the molten salt in the decomposer, the molten salt delivered to the absorber vessel 42 through the conduit 37 from the pool 33 in the decomposer is lean in aluminum trichloride. The absorber is arranged to augment the proportion of aluminum trichloride in the molten salt introduced thereto, and is specifically adapted to cause a portion of the aluminum trichloride gas discharged from the decomposer through the conduit 39 to be condensed and absorbed in the pool of lean molten salt mixture 43. This gas is led to the absorber through a conduit 47, opening downwardly into the absorber vessel 42 through the roof of the vessel on one side thereof, and communicating with the gas conduit 39 in such manner as to divert to the vessel a portion of the trichloride gas flowing through the conduit 39. The vessel 42 also includes a gas discharge outlet 49 opening through the roof of the vessel on the side thereof opposite the conduit 47, and a vertical baffle 50 extending downwardly from the roof of the vessel intermediate the conduit 47 and the gas outlet 49 and terminating above the level of molten salt in the pool 43. The baffle 50 is arranged to permit passage of gas in the vessel, i.e. from the conduit 47 to the outlet 49, only through the restricted space between the lower edge of the baffle and the surface of the molten salt pool 43. In addition, rotary impeller blades 52, 53, driven by appropriate means (not shown) and adapted to provide splash condenser action in the vessel, extend downwardly through the vessel 42 and into the pool of molten salt on respectively opposite sides of the baffle 50.

With this arrangement of elements, aluminum trichloride gas introduced to the absorber vessel 42 through the conduit 47 is exposed to a spray of molten salt mixture provided by rotation of the impeller blade 52 so as to afford an extended contact surface area for absorption of the gas in the salt mixture. Such gas as is not initially absorbed in the salt mixture passes under the baffle 50 and thence into the second region of the absorber vessel where it is again exposed to a spray of molten salt mixture provided by rotation of the impeller blade 53. In this manner, substantially complete absorption of the aluminum trichloride gas in the molten salt mixture is effected, enriching the trichloride content of the mixture as desired. Gaseous constituents other than aluminum trichloride introduced through the conduit 47, e.g. impurities in the aluminum trichloride gas flow, remain uncondensed and are discharged from the absorber vessel through the outlet 49.

The conduit 30 through which molten salt is delivered to the decomposer communicates with the absorber vessel at a locality beneath the level of the molten salt pool therein and on the opposite side of the vessel from the opening of the conduit 37, such that lean salt entering the vessel 42 from the decomposer traverses the vessel in a direction substantially countercurrent to the flow of aluminum trichloride gas therein, and is then withdrawn from the vessel, enriched in aluminum chloride by the aforementioned absorption action in the vessel, through the conduit 30. A suitable pump 55 of conventional character, connected in the conduit 30, advances the enriched salt mixture from the absorber vessel 42 back to the decomposer for re-use therein as the heat exchange medium. In other words, then, the molten salt mixture is circulated e.g. in a substantially continuous manner between the decomposer and the absorber vessel; in the decomposer, aluminum trichloride evaporates from the salt mixture due to the heat exchange action therein and the salt mixture is also heated to some extent, while in the absorber the salt mixture is cooled and the aluminum trichloride content replenished (desirably to restore the initial proportional composition of the mixture), before the mixture is returned to the decomposer.

That portion of the aluminum trichloride gas withdrawn from the decomposer which is not diverted from the conduit 39 to the absorber 42 is advantageously recycled to the converter 10 for re-use therein to provide the continuous flow of aluminum trichloride gas in the converter chamber. For this purpose, it is advanced by means of a suitable gas pump 58, positioned in the conduit 39, to an appropriate heater 60, which raises the temperature of the trichloride gas to the temperature at which it is introduced to the converter. From the heater, the trichloride gas is advanced through the converter gas inlet conduit 18 to the converter chamber.

In the light of the foregoing description, the performance of the decomposing process of the present invention with the system of FIG. 1 may be readily understood. Aluminum trichloride-containing molten salt mixture at an appropriate temperature is advanced continuously through the conduit 30, under the influence of the pump 55, to the top of the decomposer tower 26, where it is dispersed in a downwardly directed spray over the surface of the tower packing 29. Heated gas from the converter (containing aluminum monochloride mixed with unreacted aluminum trichloride), advanced through the conduit 19 to a locality in the decomposer beneath the perforate 28, flows upwardly through the plate and thence through the packing 29. As one example, the monochloride-containing gas may be delivered into the decomposer at a temperature of 1220° C. and at approximately atmospheric pressure. Gas-liquid contact between this heated gas from the converter and the molten salt mixture is effected over an extended contact surface area provided by the packing, i.e. as the molten salt and gas pass in dispersed counter-current flows over and between the packing elements or lumps.

Heat exchange occurs between the gas and salt incident to such contact, cooling the gas to a temperature at which the monochloride decomposes into aluminum metal and aluminum trichloride gas. The heat of reaction produced by this monochloride dissociation is also taken up by the salt mixture in the packing so as to maintain the monochloride at the desired reduced temperature for decomposition. As a result of such heat transfer, the temperature of the molten salt is increased and under the conditions assumed for FIG. 1, aluminum trichloride gas is also evaporated from the salt mixture, i.e. some of the heat is absorbed as heat of evaporation of aluminum trichloride, providing very efficient heat removal.

The aluminum metal produced by the monochloride decomposition passes downwardly with the flow of molten salt mixture, through the packing 29 and the perforations of the plate 28 to the sump 27. The molten aluminum, which has the higher specific gravity of the two liquids, collects in a pool at the bottom of the sump; the molten salt mixture collects in a discrete pool floating on the molten aluminum in the sump. This molten salt is somewhat elevated in temperature and to some extent reduced in aluminum trichloride content, as compared with the salt introduced to the top of the tower 26, owing to the heat exchange and evaporation of aluminum trichloride occuring as it passes, in contact with the gas from the converter, downwardly through the packing 29.

The aluminum trichloride gas produced by the monochloride decomposition and by evaporation from the molten salt in the decomposer, together with the unreacted aluminum trichloride gas from the converter introduced with the monochloride gas through the conduit 19, is continuously withdrawn from the decomposer through the conduit 39 at the top of the tower. Desirably the length of traverse of the gas from the converter through the packing 29 and the heat exchange conditions maintained in the tower are such as to effect substantially complete decomposition of the monochloride gas passing therethrough, and hence the gas withdrawn from the top of the tower through the conduit 39 is primarily only aluminum trichloride together with such gaseous contaminants or impurities (e.g. hydrogen, and sometimes methane or others) as may be produced in the converter and carried in the flow of gas therefrom.

The purified molten aluminum metal collected in the pool 32 (which remains molten because the coolant salt mixture is collected and removed from the decomposer at a temperature above the melting point of aluminum) is withdrawn therefrom from time to time, constituting the purified metallic aluminum product of the subhalide distillation system, while the heated trichloride-lean molten salt collected in the pool 33 is withdrawn continuously through the conduit 37 for delivery to the absorber vessel 42. Advantageously the withdrawal of molten aluminum from the pool 32 is controlled to maintain the level of the pool 32 below the locality of the conduit 37, so that no molten aluminum is carried with the salt mixture to the absorber, and also to maintain the level of the salt pool 33 somewhat below the locality of the conduit 19, afford a region between the salt pool 33 and the plate 28 through which the incoming gas from the converter can circulate for even upward dispersion through the plate 28.

The trichloride-lean molten salt mixture flowing from the decomposer through the conduit 37 passes into and through the absorber vessel 42, where it is cooled as by the cooling pipe 45 and exposed to a portion of the aluminum trichloride gas discharged from the decomposer through the conduit 39. Contact of the gas and the molten salt in the vessel 42 is promoted by the splash condenser action of the rotary impeller blades 52, 53; as a result of such contact, the aluminum trichloride of the gas is substantially entirely condensed and absorbed in the molten salt mixture, enriching the mixture in aluminum trichloride. The cooled, trichloride-enriched salt mixture is then advanced from the absorber vessel 42 through the conduit 30 by the action of the pump 55, back to the top of the tower 26 where it is again sprayed downwardly on the surface of the packing 29 to flow therethrough to serve as a heat exchange medium for cooling of gas from the converter in the manner above described.

As previously mentioned, the gaseous contaminants or impurities admixed with the trichloride gas diverted to the absorber vessel 42 from the main trichloride flow in the conduit 39 are discharged from the absorber vessel through the outlet 49 and thus removed from the system. In other words, there is a continuous extraction of the such impurities in the absorber vessel, which serves to counteract the continuous production of such impurities in the converter and thereby to control or limit the buildup of diluent contaminants in the recirculating flow of trichloride gas.

Very advantageously, the amount of trichloride restored to the salt mixture in the absorber vessel 42 is equal to the amount of trichloride evaporated from the salt mixture in the decomposer, such that the proportionate composition of the trichloride-containing salt mixture introduced to the top of the tower 26 remains constant during the operation of the decomposer. To this end, the proportion of the trichloride gas flow in the conduit 39 diverted through the conduit 47 to the absorber vessel is desirably equal to the proportion of such flow contributed by evaporation of trichloride from the salt mixture in the decomposer. The remainder of the trichloride gas flowing through the conduit 39 is advanced by the pump 58 through the heater 60 and thence through the conduit 18 to the converter 10. As will be appreciated, the proportion of the trichloride flow thus returned to the converter is equal or approximately equal to the proportion of the trichloride flow through the conduit 39 constituting unreacted trichloride gas advanced to the decomposer from the converter in admixture with monochloride, together with the trichloride product of monochloride dissociation in the decomposer. In such manner, a substantially constant flow of trichloride gas is returned to the converter to provide the desired continuous flow of trichloride gas therethrough.

The molten salt employed in the foregoing process may comprise a mixture of aluminum trichloride and one or more alkali metal chlorides or alkaline earth metal chlorides, reference to alkaline earth metals herein being meant to include magnesium as well as calcium and the metals specifically classed with calcium in this category of the periodic table. Specifically, the constituent salts are selected to provide a molten salt mixture of high chemical stability, low melting point, and specific gravity lower than that of molten aluminum. Thus, for example, the molten salt used may consist of a mixture of aluminum trichloride and sodium chloride containing 50 to 51 mole percent (or slightly more) of aluminum trichloride as introduced to the decomposer. Such a mixture is particularly advantageous from the standpoint of economy due to the low cost of the constituent salts.

The following specific example will serve further to illustrate the performance of the process embraced in the present invention with apparatus of the character described:

A mixture of aluminum trichloride gas and aluminum monochloride gas discharged from a subhalide converter at a temperature above 1000° C., for instance as specified above, and in such proportions as to yield one pound of purified aluminum metal for each 11 pounds of gas is introduced to the decomposer 20 through the conduit 19 in a continuous flow. Simultaneously, a molten salt mixture containing 70.5% aluminum trichloride by weight (51.2 mole percent) and 29.5% sodium chloride by weight is introduced to the top of the tower 26 through the conduit 30 in a continuous flow at an initial temperature of 675° C., and at a rate of 131.5 pounds of salt mixture per pound of purified aluminum metal produced in the decomposer (i.e., 131.5 pounds of salt mixture for each 11 pounds of gas delivered from the converter through the conduit 19). Gas-liquid contact in the tower 26 between the upwardly flowing gas mixture from the converter and the downwardly flowing molten salt mixture from the conduit 30 cools the gas, effecting decomposition of the monochloride to produce molten aluminum metal and evaporating 3.7 pounds of aluminum trichloride from the molten salt mixture for each pound of aluminum produced. The molten salt mixture, together with the molten aluminum produced by the monochloride decomposition, flows downwardly through the decomposer to collect in the sump 27. As thus collected in the sump (i.e. after passage through the tower 26) the molten salt contains 69.8% aluminum trichloride by weight (50.2 mole percent) and 30.2% sodium chloride by weight and is at a temperature of 750° C. 127.8 pounds of such trichloride-lean salt mixture collect in the sump and are passed to the absorber vessel 42 for each pound of aluminum produced in the decomposer. 13.7 pounds of aluminum trichloride gas are discharged from the decomposer through the conduit 39 per pound of aluminum produced, and of this flow 3.7 pounds of aluminum trichloride gas (i.e., a proportion equal to the proportion of aluminum trichloride evaporated from the molten salt mixture in the decomposer) are diverted through the conduit 47 to the absorber vessel 42. The remainder of the trichloride flow, viz., 10 pounds of trichloride gas per pound of aluminum produced in the decomposer, is returned through the conduit 39, pump 58, heater 60, and conduit 18 to the converter. In the absorber vessel 42, the aluminum trichloride gas advanced thereto is condensed and absorbed in the lean molten salt mixture, so that the molten salt mixture leaving the vessel 42 contains 70.5% by weight aluminum trichloride and 29.5% by weight sodium chloride and due to the cooling action in the vessel 42 is again at a temperature of 675° C. For each 127.8 pounds of lean molten salt mixture advanced to the absorber vessel 42, 131.5 pounds of this enriched salt mixture are withdrawn through the conduit 30.

As will be appreciated, the quantitative values set forth in the foregoing example are to be taken as exemplary of the relative proportions of liquids and gases involved in the performance of the process, i.e., expressed in terms of pounds of material used or produced per pound of purified aluminum metal produced in the decomposer. Under the specific conditions given for FIG. 1, approximately 15% of the heat removal is due to the evaporation of aluminum trichloride in the decomposer, a proportion which may be readily varied by varying the composition of the molten salt feed into the top of the decomposer.

In practice, the present process may be carried out on any desired scale of operation with equally good results; since the heat removal effected in the decomposer is provided by intimate contact between gas and molten salt, any given flow of gas from the converter may be handled in the decomposer by providing sufficient molten salt at the appropriate temperature and gas-liquid contact means of appropriate dimension and character. Temperature conditions as discussed hereinabove have for some purposes been related to the melting point of pure aluminum, approximately 660° C., but it will be understood that in some cases the produced aluminum metal may in fact be an alloy, for example an alloy containing some manganese. In the latter situation, the alloy (which can still be considered as purified, relative to the crude material from which its dissociated halides were originally derived) will have a somewhat lower melting point than the above figure; hence references herein simply to the melting point of aluminum will generally be taken as embracing values for similarly produced alloys, as of the nature stated.

FIG. 2 illustrates a modified system, adapted for a mode of procedure wherein there is no evaporation from the molten salt in the decomposer, heat being removed essentially wholly by absorption in the salt mixture. Here the decomposer 70 may be similar to the device 20 of FIG. 1, receiving a gaseous mixture of aluminum monochloride and trichloride through conduit 19a from the converter and discharging gaseous aluminum trichloride through conduit 39a for recirculation, the converter and other parts of the main gas circulation system being the same as in FIG. 1 and therefore not shown again. From a conduit 72, which may include a pump 73, molten salt mixture is supplied to the decomposer 70 for contact with the gas therein, and is withdrawn at a higher temperature, through a conduit 74, to traverse a cooler 75 and return to the line 72. The cooler 75 may be of any suitable character, being simply shown as having cooling means 76 which is in heat exchange relation with the salt and which may be supplied with coolant fluid from an outside source not shown. To facilitate control, the conduit 74 may have a valve 78, and the cooler may have a by-pass conduit 79 including a valve 80; close regulation of the cooling operation and of corresponding temperature conditions may be achieved by appropriate adjustment of the valves 78 and 80. Aluminum metal, in molten state, produced by decomposition of the monochloride, is withdrawn at 35, as in FIG. 1.

A specific example of a process performed with the system of FIG. 2 involving no evaporation in the decomposer is as follows: For each 11 pounds of gas consisting of aluminum monochloride and aluminum trichloride supplied at 19a from the converter in proportions to yield one pound of pure molten aluminum (as at 35) by essentially complete decomposition of the monochloride, 152 pounds of molten salt mixture are circulated as heat-removing agent through the decomposer 70, such being a liquid mixture of aluminum trichloride and sodium chloride containing 50.2 mole percent aluminum trichloride. Entering the decomposer 70 at 72, the molten salt has a temperature of 675° C.; heated by cooling the gas and by effecting decomposition of the aluminum monochloride, the salt (having the same composition as stated above) leaves the decomposer (conduit 74) at 750° C., and on traversing the cooler, is restored to the temperature of 675° C. for recirculation by the pump 73. As will be seen, there is no evaporation of aluminum trichloride from the molten salt, so that from each 11 pounds of input gas, 10 pounds of gaseous trichloride is discharged from the decomposer at 39a, for recirculation (or other appropriate handling) in the main system.

While in the foregoing description specific reference has been made to the use of a packed tower, represented in FIG. 1 by the tower portion 26 and packing 29 of the decomposer 20, the present invention may be practiced with any suitable gas-liquid contacting device, such as a splash condenser, tray column, spray tower, or wetted wall column, i.e. any suitable means providing an extended gas-liquid contact surface area; or the gas-liquid contact may be effected in a jet pump in which the monochloride-containing gas from the converter is simultaneously decomposed and compressed for recirculation to the converter 10. Also, while specific reference has been made to a mixture of aluminum trichloride and sodium chloride as the molten salt used as the heat exchange medium in the decomposer, it will be appreciated that other molten salt mixtures, incorporating a substantial proportion of aluminum trichloride together with other alkali metal chlorides or alkaline earth metal chlorides, may equally be used, as indicated above.

More generally, it will be appreciated that the present invention in its broader aspects is not limited to use with subhalide distillation systems employing aluminum trichloride and involving the synthesis of aluminum monochloride, but may be adapted for use with other aluminum subhalide distillation operations to effect the decomposition of aluminum subhalides other than aluminum monochloride. By way of example, in one alternative form of subhalide distillation operation the crude alloy or other impure aluminum-bearing material to be refined is exposed to an upward flow of aluminum tribromide gas (i.e. $AlBr_3$), in a suitable converter such as the converter 10 in the system illustrated, under the elevated temperature conditions described above. Aluminum in the alloy reacts with the tribromide gas to form aluminum monobromide (i.e. AlBr) which is withdrawn from the converter together with unreacted tribromide gas. In accordance with the present invetion this monobromide-containing gas is conducted to the decomposer 20 and cooled by heat-exchange contact with a molten salt as before. Upon cooling, the monobromide dissociates into purified aluminum metal and aluminum tribromide gas.

For such operation, it is desirable to use as the heat exchange medium in the decomposer a molten salt mixture including a substantial proportion of aluminum tribromide together with other salt or salts, e.g. such as alkali metal bromides or alkaline earth metal bromides. The heat exchange effected in the decomposer between this tribromide-containing molten salt mixture and the monobromide-containing gas from the converter may be such, if desired, as to evaporate some tribromide from the salt mixture; the resultant tribromide gas may be discharged together with the tribromide gas otherwise produced in or introduced to the decomposer through the conduit 39 while the molten aluminum product and tribromide-lean molten salt mixture are separately withdrawn through outlets 35 and 37 respectively. Tribromide may be restored to the salt mixture in a condenser such as the absorber vessel 42 of the system illustrated, i.e. by diverting a portion of the tribromide gas withdrawn from the decomposer to such vessel and effecting condensation of the tribrmodie gas in the molten salt mixture therein. In other words, the operation of the apparatus illustrated and the performance of the process of the present invention in an aluminum subhalide distillation system employing tribromide rather than trichloride and involving the synthesis of aluminum monobromide rather than aluminum monochloride is essentially similar to that described in detail above in connection with the decomposition of aluminum monochloride.

As a further modification of the present invention, the molten salt used in the decomposer may have a specific gravity higher than that of molten aluminum, rather than a lower specific gravity as in the embodiment described above. In such case, of course, the molten salt will collect in a pool at the lower end of the decomposing region, and the molten aluminum will float thereon; the molten aluminum may be withdrawn through a product discharge outlet suitably positioned in the wall of the sump 27 and the molten salt may be withdrawn, e.g. through a conduit opening at the bottom of the sump. An example of such a salt mixture (believed to be especially suitable for use in the decomposition of aluminum monobromide referred to above) is a molten mixture of barium bromide and aluminum tribromide.

In general, the molten salt composition is composed of material of the category of aluminum halides, and of other metal salts, e.g. halides, which are stable at the temperatures involved and in the presence of the aluminum salts and metallic aluminum, the composition being chosen to have a melting point below that of aluminum and the composition also preferably being such that it retains a substantial portion of its integrity as a molten material at the temperatures for subhalide decomposition, i.e. in that evaporation of any part may be in effect controlled or limited so as to maintain at least some quantity of salt for the desired heat removing function throughout the decomposing region. In particular, as explained above, exceptionally useful compositions are selected from the class consisting of aluminum halides and halides of alkali metals and alkaline earth metals (including magnesium, as has been noted).

As will be apparent, the molten salt entering the decomposer should have a temperature well below (and preferably very substantially below) the point at which decomposition of the incoming monochloride or other subhalide will begin. Ordinarily, because of considerations of economy, the basic process conditions are selected so that the subhalide-containing gas reaches the decomposer at a temperature only slightly above the temperature at which decomposition commences. Decomposition, of course, occurs at all temperatures lower than the last-mentioned value, which (as indicated) is usually just below that of the gas leaving the converter or in every case is readily ascertainable from the conditions of conversion and of gas delivery from the converter. In any event, it will be understood that the selection of a suitable temperature for the incoming molten salt mixture will ordinarily have no close relation to the upper limit of the decomposition range, but will preferably be effected at a far lower point which can be easily chosen for any given converter conditions, i.e. as explained hereinabove (in the light of readily determinable heat-removal requirements and with the aid of simple tests if necessary), so that there is satisfactory, complete decomposition of subhalide in the received gas and ultimate collection of aluminum metal in molten form.

It is to be understood that the invention is not limited to the specific procedures and embodiments herein shown and described, but may be carried out in other ways without departure from its spirit.

We claim:

1. A method of recovering metallic aluminum from aluminum subhalide gas, comprising establishing a circulating flow of molten salt at a subhalide-decomposing temperature while exposing said salt for contact with gas at a first locality in said circulating flow, and conducting the subhalide gas into heat-exchange contact with said exposed molten salt at said first locality to reduce the temperature of said gas for decomposition thereof to yield aluminum metal and normal aluminum halide gas, while transferring said molten salt from said first locality to a second locality in said circulating flow and removing heat from said molten salt at said second locality.

2. A method according to claim 1, wherein said molten salt is moved countercurrent to the subhalide gas and carries the produced aluminum from said first locality for collection of said aluminum as a body of molten metal.

3. A method of recovering metallic aluminum from aluminum subhalide gas, comprising establishing a circulating flow of molten halide salt at a subhalide-decomposing temperature through a confined region while exposing said salt for contact with gas at a first locality in said circulating flow within said region, conducting the subhalide gas into heat-exchange contact with said exposed molten salt at said first locality to reduce the temperature of said gas for decomposition thereof to yield aluminum metal and normal aluminum halide gas, collecting said aluminum metal in a molten body at a lower portion of said confined region, conducting said molten salt from said first locality through said lower portion of said confined region, as a discrete molten body, to a second locality in said circulating flow, and removing heat from said molten salt at said second locality.

4. A method of recovering metallic aluminum from aluminum subhalide gas, comprising establishing a circulating flow of molten salt mixture containing normal aluminum halide, at a subhalide-decomposing temperature, through a confined region while exposing said molten mixture for contact with gas at a first locality in said circulating flow within said region, and conducting the subhalide gas into heat-exchange contact with said exposed mixture at said first locality to reduce the temperature of said subhalide gas for decomposition thereof to yield aluminum metal and normal aluminum halide gas, whereby said mixture is heated and normal aluminum halide is evaporated therefrom, while transferring said molten mixture from said first locality to a second locality in said circulating flow and removing heat from said molten mixture at said second locality, and while supplying normal aluminum halide to said mixture at a locality in said flow external to said confined region.

5. A method according to claim 4, wherein said step of supplying normal aluminum halide to said mixture comprises conducting normal aluminum halide gas from said confined region into contact with said flow of mixture as second in said cooling locality and condensing said normal aluminum halide gas in said mixture.

6. A method of recovering metallic aluminum from aluminum subhalide gas, comprising establishing a circulating flow of molten mixture of halide salts containing normal aluminum halide, at a subhalide-decomposing temperature, through a confined region while exposing said molten mixture for contact with gas at a first locality in said circulating flow within said region, conducting the subhalide gas into heat-exchange contact with said exposed mixture at said first locality to reduce the temperature of said subhalide gas for decomposition thereof to yield aluminum metal and normal aluminum halide gas, whereby said mixture is heated and normal aluminum halide is evaporated therefrom, collecting said aluminum metal in a molten body at a lower portion of said confined region, conducting said molten mixture from said first locality through said lower portion of said confined region, as a discrete molten body, to a second locality in said circulating flow, removing heat from said molten mixture at said second locality, conducting normal aluminum halide gas from said confined region into contact with said flow of mixture at a locality external to said confined region, and condensing said normal aluminum halide gas in said mixture at said last-mentioned locality.

7. A method according to claim 6, wherein said mixture has a lower specific gravity than molten aluminum.

8. A method according to claim 6, wherein said mixture has a higher specific gravity than molten aluminum.

9. A method of recovering metallic aluminum from aluminum monochloride gas, comprising establishing a circulating flow of molten chloride salt mixture including aluminum trichloride as a constituent thereof, at a monochloride-decomposing temperature, through a confined region while exposing said molten mixture for contact with gas at a first locality in said circulating flow within said region, and conducting the mono-chloride gas into heat-exchange contact with said exposed mixture at said first locality to reduce the temperature of said monochloride gas for decomposition thereof to yield aluminum metal and aluminum trichloride gas, while transferring said molten mixture from said first locality to a second locality in said circulating flow and removing heat from said mixture at said second locality.

10. A method according to claim 9, wherein said mixture has a lower specific gravity than molten aluminum, and including the steps of collecting said aluminum metal in a molten body at a lower portion of said confined region and conducting said molten mixture from said first locality through said lower portion of said confined region, as a discrete molten body floating on said molten aluminum body, to said second locality in said circulating flow.

11. A method according to claim 9, wherein said molten salt mixture comprises a molten mixture of aluminum trichloride and sodium chloride.

12. A method of recovering metallic aluminum from aluminum monochloride gas, comprising establishing a circulating flow of molten mixture of halide salts including aluminum trichloride as a constituent thereof, at a monochloride-decompsing temperature, through a confined region while exposing said molten mixture for contact with gas at a first locality in said circulating flow within said region, and conducting the monochloride gas into heat-exchange contact with said exposed mixture at said first locality to reduce the temperature of said monochloride gas for decomposition thereof to yield aluminum metal and aluminum trichloride gas, whereby said mixture is heated and aluminum trichloride is evaporated therefrom, while transferring said molten mixture from said first locality to a second locality in said circulating flow and removing heat from said molten mixture at said second locality, and conducting aluminum trichloride gas from said confined region into contact with said flow of mixture at a locality external to said confined region and condensing said trichloride gas in said mixture at said last-mentioned locality.

13. A method of recovering metallic aluminum from aluminum monochloride gas, comprising establishing a circulating flow of molten salt mixture including aluminum trichloride as a constituent thereof, and having a sepcific gravity lower than molten aluminum, through a confined region while exposing said molten mixture for contact with gas at a first locality in said circulating flow within said region, the remainder of said mixture being of the class of chloride salts of metals selected from the group consisting of alkali and alkaline earth metals, said mixture being circulated through said region at a monochloride-decomposing temperature, conducting the monochloride gas into heat-exchange contact with said exposed mixture at said first locality to reduce the temperature of said monochloride gas for decomposition thereof to yield aluminum metal and aluminum trichloride gas, whereby said mixture is heated and aluminum trichloride is evaporated therefrom, withdrawing aluminum trichloride gas from said confined region, collecting said aluminum metal in a molten body at a lower portion of said confined region, conducting said molten mixture from said first locality through said lower portion of said confined region, as a discrete molten body floating on said molten aluminum body, to a second locality in said circulating flow, removing heat from said molten mixture at said second locality, conducting aluminum trichloride gas from said confined region into contact with said flow of mixture at a locality external to said confined region, and condensing said trichloride gas in said mixture at said last-mentioned locality.

14. A method according to claim 13, wherein gaseous impurities carried with said aluminum trichloride gas to said last-mentioned locality are separated from said trichloride gas as said trichloride gas condenses in said last-mentioned locality.

15. A method of recovering metallic aluminum from aluminum monochloride gas discharged from a converting region of an aluminum subhalide distillation system, comprising establishing a circulating flow of a molten salt mixture including aluminum trichloride as a constituent thereof, and having a specified gravity lower than molten aluminum, through a confined region while exposing said molten mixture for contact with gas at a first locality in said circulating flow within said region, the remainder of said mixture being of the class of halide salts of metals selected from the group consisting of alkali and alkaline-earth metal, said mixture being circulated through said region at a monochloride-decomposing temperature, conducting the monochloride gas through said first locality in said confined region in a direction countercurrent to said flow of molten salt mixture and in heat-exchange contact with said exposed mixture over an extended contact surface area therein to reduce the temperature of said monochloride gas for decomposition thereof to yield aluminum metal and aluminum trichloride gas, withdrawing aluminum trichloride gas from said confined region, collecting aluminum metal in a molten body at a lower portion of said confined region, conducting said molten mixture from said first locality through said lower portion of said confined region, as a discrete molten body floating on said molten aluminum body, to a second locality in said circulating flow external to said confined region and removing heat from said mixture at said second locality.

16. A method according to claim 15, wherein the flow of molten salt mixture is introduced to the confined region at a temperature of about 675° C., the monochloride gas is introduced thereto at a temperature above 1000° C., and the flow of mixture is conducted from said region at a temperature of about 750° C., and wherein by removing heat from said mixture at said second locality, said mixture is restored to a temperature of about 675° C., said method including thereafter recirculating said mixture through the confined region.

17. Apparatus for decomposing aluminum subhalide gas, comprising, in combination, a decomposer having a closed tower chamber and including a perforate member extending horizontally through said chamber and a packing of elements supported on said perforate member and a sump portion below said perforate member adapted to contain bodies of liquid, gas inlet means for introducing subhalide gas to an upper locality in said sump portion below said perforate member, salt inlet means for introducing a downwardly directed flow of molten salt to said tower chamber above said packing, first outlet conduit means for withdrawing normal aluminum halide gas from said tower chamber above said packing, second outlet conduit means for withdrawing molten aluminum metal from a body thereof at the lower extremity of said sump portion, third outlet conduit means at a level of said sump portion above said second outlet conduit means, for separately withdrawing molten salt from a body thereof floating on said body of molten aluminum in said sump portion, a condenser including a vessel disposed and adapted to receive molten salt from said third outlet conduit means, conduit means for conveying to said vessel a preselected proportion of the normal aluminum halide gas withdrawn from said chamber through said first outlet conduit means, cooling means for removing heat from said molten salt in said vessel, means for effecting intimate contact between molten salt and normal aluminum halide gas in said vessel, means for discharging gas from said vessel, and means for recirculating molten salt from said vessel through said said inlet means to said tower chamber.

18. Apparatus for decomposing aluminum subhalide gas, comprising, in combination, means defining a closed decomposing chamber, gas inlet means for introducing subhalide gas to said decomposing chamber, salt inlet means for introducing molten salt to said decomposing chamber at an upper region thereof, means in said decomposing chamber for distributing said molten salt to provide an extended gas-liquid contact surface therein, said gas inlet means, said salt inlet means, and said molten salt distributing means being mutually arranged to promote intimate heat-exchange contact between said molten salt and said subhalide gas in said decomposing chamber, first outlet conduit means for withdrawing normal aluminum halide gas from said decomposing chamber, second outlet conduit means at a lower level for withdrawing molten aluminum metal from a lower portion of said decomposing chamber, third outlet conduit means at a different lower level for separately withdrawing molten salt from another lower portion of said decomposing chamber, means for recycling molten salt from said third outlet conduit means through said salt inlet means to said decomposing chamber, means associated with said recycling means and defining a condensing chamber, for receiving molten salt from the third outlet conduit means, means for cooling the molten salt advanced from said third outlet conduit means to said condensing chamber, means having connection with the first outlet conduit means, for introducing to said condensing chamber normal aluminum halide gas withdrawn from said decomposing chamber, and means for promoting intimate contact between said normal aluminum halide gas and said molten salt in said condensing chamber, for absorption of normal halide gas in said molten salt.

References Cited by the Examiner

UNITED STATES PATENTS

| 2,255,549 | 9/1941 | Kruh | 75—68 |
| 2,376,045 | 5/1945 | Gaither | 23—294 |
| 2,387,228 | 10/1945 | Arnold | 23—93 |
| 2,462,661 | 2/1949 | Munday | 75—68 |
| 2,470,305 | 5/1949 | Gross | 75—68 |
| 2,621,120 | 12/1952 | Pederson | 75—68 |
| 2,622,019 | 12/1952 | Scheuer | 75—68 |
| 2,758,023 | 8/1956 | Bareis | 75—63 |
| 2,760,858 | 8/1956 | Findlay | 75—84.5 |
| 2,914,398 | 11/1959 | Johnston | 75—68 |
| 3,078,159 | 2/1963 | Hollingshead | 75—68 |

FOREIGN PATENTS 635,318   4/1950   Great Britain.

DAVID L. RECK, *Primary Examiner.*

BENJAMIN HENKIN, *Examiner.*